(12) United States Patent
Paul et al.

(10) Patent No.: US 12,154,068 B2
(45) Date of Patent: Nov. 26, 2024

(54) INTERNET OF THINGS FLEET MANAGEMENT WITH OUT OF SEQUENCE STOP DETECTION

(71) Applicant: Oracle International Corporation, Redwood Shores, CA (US)

(72) Inventors: Rahul Paul, Karnataka (IN); Sourath Roy, Karnataka (IN); Bharath T. S., Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 49 days.

(21) Appl. No.: 17/809,400

(22) Filed: Jun. 28, 2022

(65) Prior Publication Data

US 2023/0186230 A1 Jun. 15, 2023

(30) Foreign Application Priority Data

Dec. 9, 2021 (IN) .............................. 202141057201

(51) Int. Cl.
*G06Q 10/0833* (2023.01)
*G06Q 10/083* (2024.01)
(Continued)

(52) U.S. Cl.
CPC ..... *G06Q 10/0833* (2013.01); *G06Q 10/0838* (2013.01); *G07C 5/008* (2013.01);
(Continued)

(58) Field of Classification Search
CPC . G06Q 10/0833; G06Q 10/0838; H04W 4/38; H04W 4/021; G16Y 40/60; G07C 5/008; G08G 1/207
See application file for complete search history.

(56) References Cited

U.S. PATENT DOCUMENTS 7,755,541 B2 7/2010 Wisherd et al.
10,382,294 B2 8/2019 Bali et al.
(Continued)

FOREIGN PATENT DOCUMENTS

| CN | 104866999 A | 8/2015 |
|---|---|---|
| CN | 107622364 A | 1/2018 |
| WO | 2019075138 A1 | 4/2019 |

OTHER PUBLICATIONS

Fabrice Reclus, Geofencing for fleet & freight management, 2009, p. 353-354 (Year: 2009).*

(Continued)

*Primary Examiner* — Ibrahim N El-Bathy
(74) *Attorney, Agent, or Firm* — Potomac Law Group, PLLC

(57) ABSTRACT

Embodiments detect stops by an entity on a pre-planned trip that includes a plurality of stops and a planned sequence of stops. Embodiments receive a first geo-location message indicating a first location and corresponding first time for the entity. Embodiments, based on the first geo-location message and a previous geo-location message, generate an enter geofence set and an exit geofence set. When the entity is currently, based on the previous geo-location message, at one of the stops and the current stop is in the exit geofence set, embodiments store the first time as a departure time for the current stop. When the entity is not currently, based on the previous geo-location message, at one of the stops and the enter geofence set is non-empty, embodiments store the first time as an arrival time for a stop corresponding to the first location.

20 Claims, 6 Drawing Sheets

(51) Int. Cl.
    *G07C 5/00*            (2006.01)
    *G16Y 40/60*       (2020.01)
    *H04W 4/021*      (2018.01)
    *H04W 4/38*        (2018.01)

(52) U.S. Cl.
    CPC ............ *G16Y 40/60* (2020.01); *H04W 4/021* (2013.01); *H04W 4/38* (2018.02)

(56) References Cited

U.S. PATENT DOCUMENTS

| | | | |
|---|---|---|---|
| 10,421,437 | B1 | 9/2019 | Koskan |
| 10,863,302 | B2 | 12/2020 | Gonzalez et al. |
| 10,957,204 | B1 | 3/2021 | Kumar et al. |
| 2004/0243664 | A1* | 12/2004 | Horstemeyer ........... G08G 1/20 709/200 |
| 2010/0007500 | A1 | 1/2010 | Mestres et al. |
| 2011/0050397 | A1 | 3/2011 | Cova |
| 2013/0147617 | A1 | 6/2013 | Boling et al. |
| 2013/0225282 | A1* | 8/2013 | Williams ............ G07F 17/3241 463/29 |
| 2016/0232483 | A1 | 8/2016 | London et al. |
| 2016/0379165 | A1 | 12/2016 | Moakley |
| 2017/0127249 | A1 | 5/2017 | Li et al. |
| 2018/0081374 | A1 | 3/2018 | Nimchuk et al. |
| 2018/0158020 | A1 | 6/2018 | Khasis |
| 2018/0288566 | A1 | 10/2018 | Lu |
| 2020/0064865 | A1 | 2/2020 | Lei et al. |
| 2021/0293555 | A1 | 9/2021 | Roherty et al. |
| 2021/0302979 | A1* | 9/2021 | McAlpine ........... G01C 21/3407 |
| 2022/0046381 | A1* | 2/2022 | Ong ........................ G08G 1/164 |
| 2022/0132274 | A1 | 4/2022 | S et al. |
| 2023/0147126 | A1 | 5/2023 | Iwamoto et al. |
| 2023/0186230 | A1 | 6/2023 | Paul et al. |
| 2023/0188941 | A1* | 6/2023 | Palop ..................... H04W 4/021 455/456.1 |
| 2023/0336940 | A1 | 10/2023 | Yim et al. |
| 2024/0166076 | A1 | 5/2024 | Rosenblatt et al. |

OTHER PUBLICATIONS

Unknown, "How it Works", SenseAware, https://www.senseaware.com, last downloaded on Oct. 30, 2020.

Unknown, "Managed Solution for High-Value Asset and fleet Tracking", https://www.sierrawireless.com/products-and-solutions/sims-connectivity-and-cloud-services/managed-iot-solutions/asset-tracking/ 1/, last downloaded on Oct. 30, 2020.

Unknown, "SenseAware is FedEx's IoT response to supply chain optimization", htpps://www.rcrwireless.com/20160929/big-data-anlytics/fedex-iot-tag31, last downloaded on Oct. 30, 2020.

Unknown, "What is SenseAware?", www.senseaware.com, last downloaded on Oct. 30, 2020.

Unknown, Domo IoT Asset Tracking, https://webcache.googleusercontent.com/search?q=cache:A9f7PEUpR_gJ: https://aws.amazon.com/iot/solutions/DomoVerizon/+&cd=1&hl=en&ct=cInk&gl=us, last downloaded on Oct. 30, 2020.

\* cited by examiner

INTERNET OF THINGS FLEET MANAGEMENT WITH OUT OF SEQUENCE STOP DETECTION

One embodiment is directed generally to a computer system, and in particular to fleet management using a computer system.

BACKGROUND INFORMATION

Large quantities of cargo are transported daily across the continental US and in most other industrial countries using transportation carriers. The use of tractor-trailers as cargo transport vehicles provided by the trucking industry accounts for a significant portion of the vehicles utilized to transport cargo, typically in the form of a "fleet" of trucks. In the trucking industry, cargo is arranged to be transported from an origination point to a destination point via a particular tractor-trailer, driven by an operator/driver.

Remotely managing/monitoring all items associated with a trip is necessary to track inventories and progress in the transport. Specifically, there is a need for real-time end-to-end transportation visibility and insights into business entities, such as vehicle location, condition of containers, status of in-transit inventory, cargo condition, operational costs, vehicle use, and driving behavior.

SUMMARY

Embodiments detect stops by an entity on a pre-planned trip that includes a plurality of stops and a planned sequence of stops. Embodiments receive a first geo-location message indicating a first location and corresponding first time for the entity. Embodiments, based on the first geo-location message and a previous geo-location message, generate an enter geofence set and an exit geofence set. When the entity is currently, based on the previous geo-location message, at one of the stops and the current stop is in the exit geofence set, embodiments store the first time as a departure time for the current stop. When the entity is not currently, based on the previous geo-location message, at one of the stops and the enter geofence set is non-empty, embodiments store the first time as an arrival time for a stop corresponding to the first location.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a fleet management/monitoring system that automatically detects out of sequence stops on a planned trip.

In a fleet management system, the arrival and departure detection for a stop is based on a stop detection radius. At any point during the execution of the trip, if the recent known location of the trip falls anywhere within the stop detection radius of the stop, then arrival at the stop is registered. Following the arrival detection for a stop, when the last known location of the trip falls outside the stop detection radius of this stop, the trip has considered to have departed from the stop.

Known fleet management systems, in general, detect stops as per the planned sequence of the stops for a given trip. In contrast, embodiments of the invention capture all the arrival and departure "events", referred to as "arrival-time" and "departure-time", respectively, on a trip regardless of if they happened in the planned sequence or not. This is especially helpful in cases were the execution of the trip does not follow the planned stop sequence.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
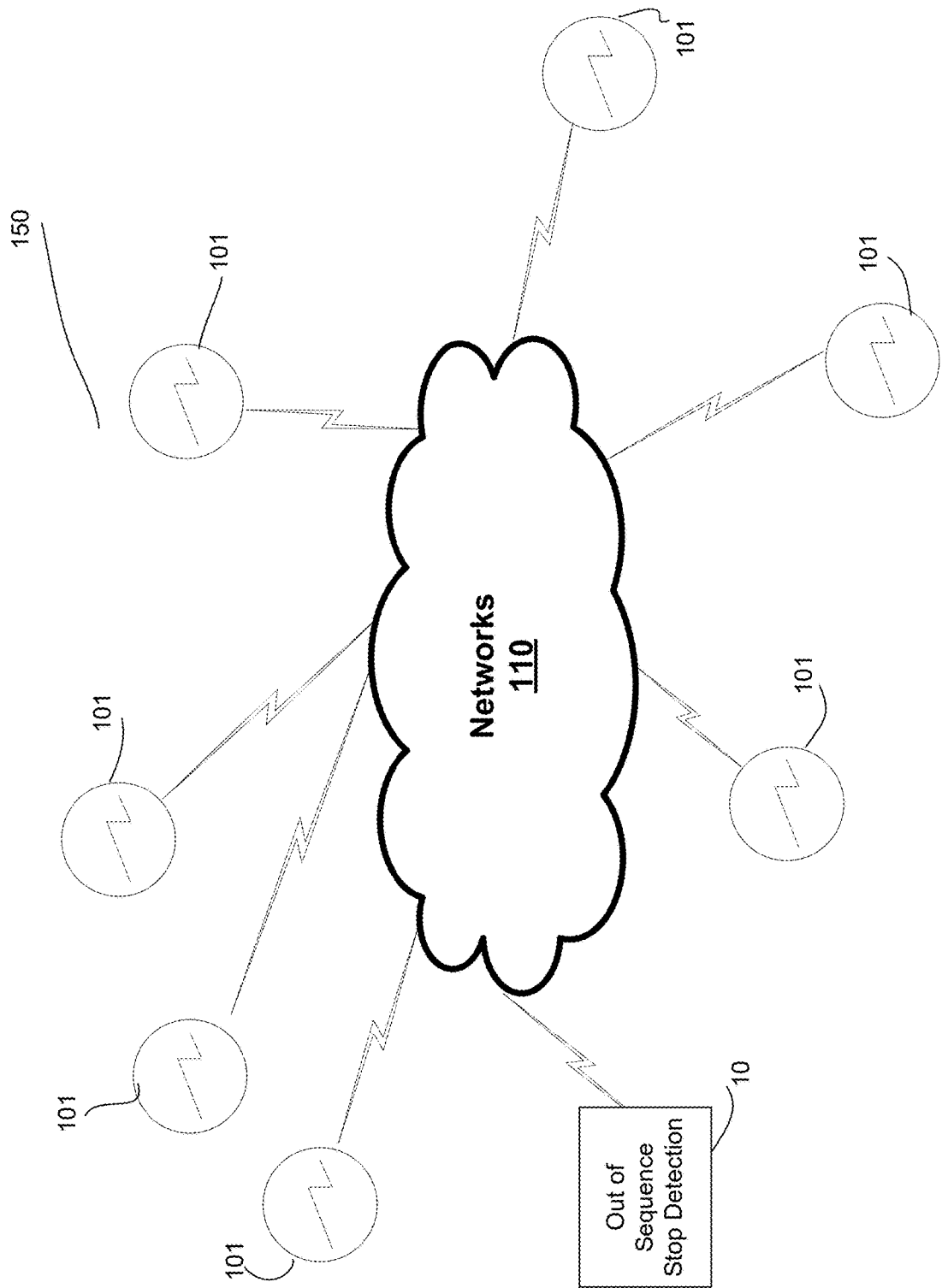
FIG. 1 is an overview diagram of elements of a fleet management out of the sequence stop detection network/system that can implement embodiments of the invention.

FIG. 1 is an overview diagram of elements of a fleet management out of sequence stop detection network/system 150 that can implement embodiments of the invention. Network 150 includes multiple sensors 101 that form a sensor network 150 in combination with one or more networks 110. Each of sensors 101 can be considered an Internet of Things ("IoT") device with the associated processing and communication capabilities. System 150 may include a relatively large number of sensors 101. For example, for a fleet of "trucks" that are being monitored, each portion of the truck may include a sensor (e.g., the actual truck body and the one or more trailers that are being pulled by the truck, and each item that is loaded into each of the trailers).

An IoT device can be any device that has a sensor attached to it and can transmit data from one object to another or to people with the help of Internet. IoT devices include wireless sensors, software, actuators, and computer devices. They are attached to a particular object that operates through the Internet, enabling the transfer of data among objects or people automatically without human intervention. Each of sensors 101 can include a processor/controller, and a communication interface that uses protocols such as Modbus, Zigbee, or proprietary protocols, to connect to an Edge Gateway.

Network 150 may be used for a variety of purposes, such as, for example, in the transportation industry, where vehicle fleet management is aided by the continuous acquisition of data by sensors that are attached to vehicles. In this embodiment, sensor network 150 may acquire data that may be monitored and processed for such purposes as aiding vehicle maintenance, optimizing vehicle routes, promoting driver safety, etc. Each of sensors 101 communicate, wirelessly or wired, through one or more networks 110. Networks 110 include the Internet, but may also include private on-premise networks that ultimately interface with the Internet as well as any other type of network that allows sensors 101 to communicate.

A fleet management out of sequence stop detection server 10 is coupled to networks 110 to send and receive data from sensors 101. Fleet management out of sequence stop detection 10 provides the fleet management out of sequence stop detection functionality disclosed herein. In general, fleet management out of sequence stop detection 10 monitors data acquired by each of sensors 101 for purposes of automatically detecting out of sequence stops (relative to pre-planned trip) during a trip.

Figure 2:
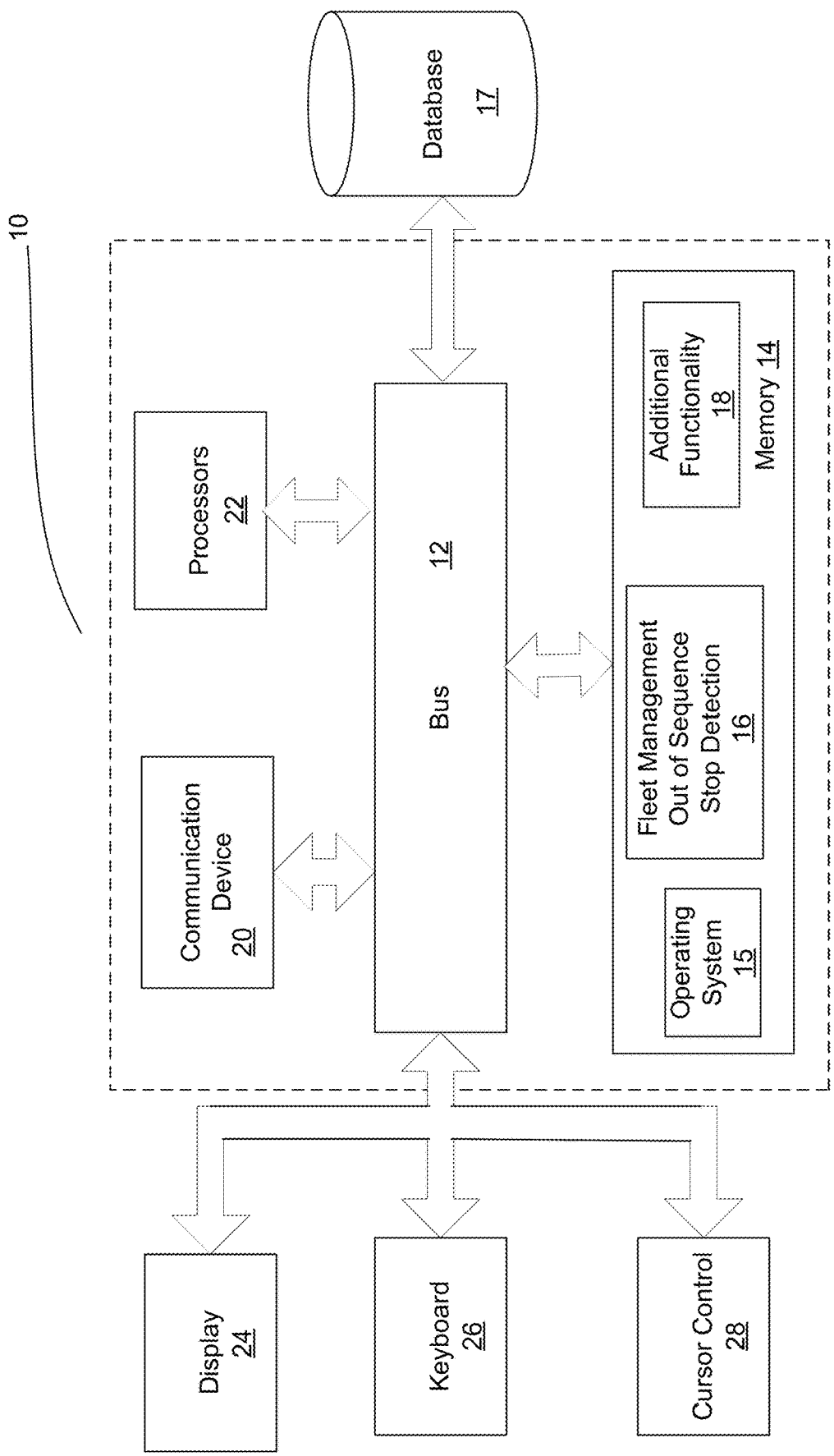
FIG. 2 is a block diagram of the fleet management out of sequence stop detection of FIG. 1 in the form of a computer server/system in accordance with an embodiment of the present invention.

FIG. 2 is a block diagram of fleet management out of sequence stop detection 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a fleet management out of sequence stop detection module 16 that automatically detects out of sequence stops for a pre-planned trip, and all other functionality disclosed herein. System 10 can be part of a larger system. Therefore, system 10 can include one or more additional functional modules 18 to include the additional functionality, such as the "IoT Asset Monitoring Cloud Service" or "IoT Fleet Monitoring Cloud" from Oracle Corp. A file storage device or database 17 is coupled to bus 12 to provide centralized storage for modules 16 and 18, including data generated by the sensors in the form of messages or data points. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Embodiments include functionality that is included in a fleet monitoring system that monitors entities including trips, shipments, vehicles, equipment in vehicles, ship-orders, ship-units or packages, ship-items, and the drivers assigned to a trip. The "trip" is a collection of goods that is being transported, has been, or needs to be transported from one geographic location to another. The trip also encompasses the route defined for the movement of the goods.

Figure 3:
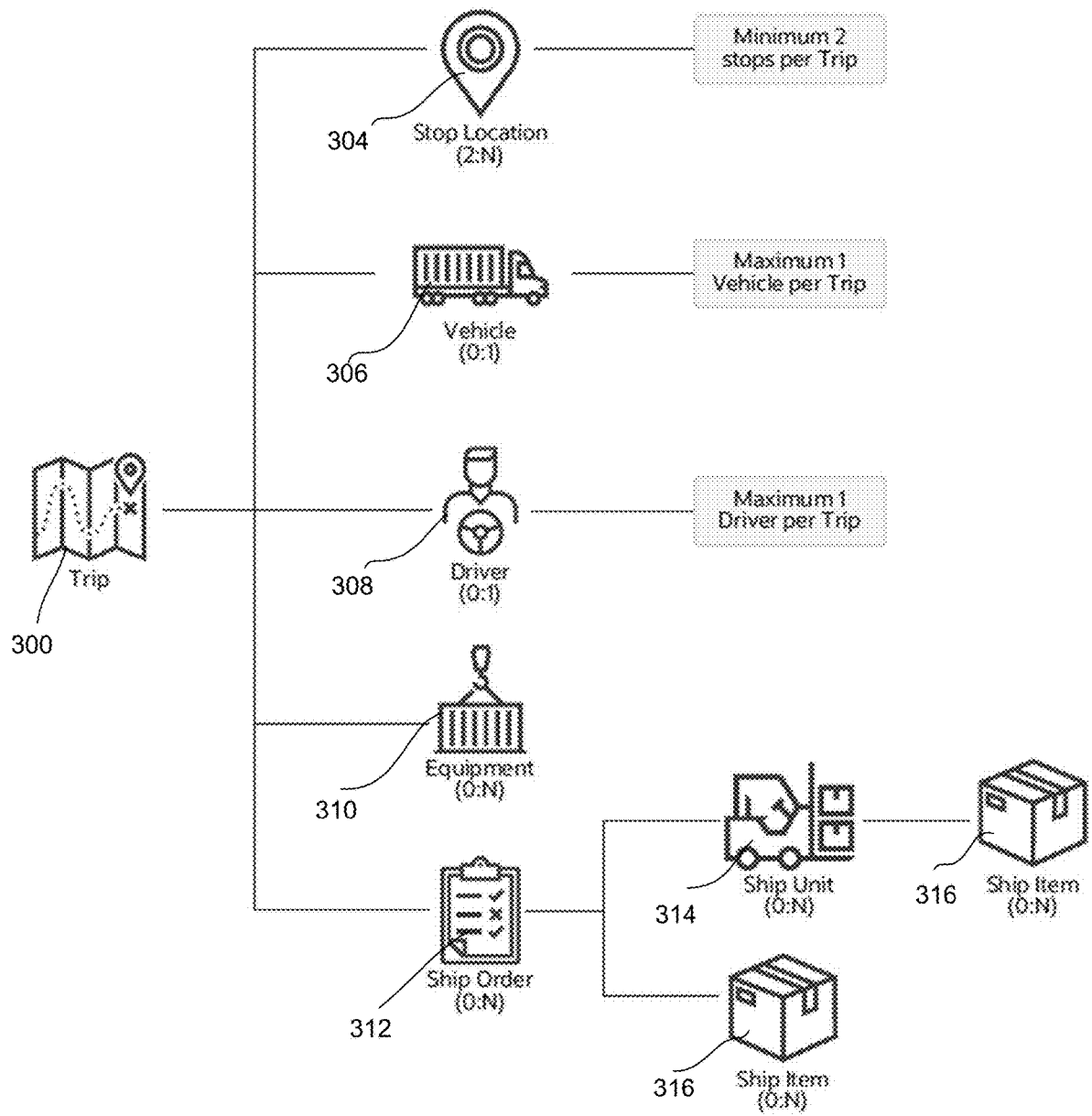
FIG. 3 illustrates the entities/sub-entities that may form a planned trip in accordance to embodiments.

FIG. 3 illustrates the entities/sub-entities that may form a planned trip 300 in accordance to embodiments. In addition to the start location and the final destination location, not shown, sub-entities include stop locations 304, which are the intermediate stops between the source and destination. They are either delivery points or pick up points. Sub-entities further includes a vehicle 306, which is a conveyance such as a truck or a car for transporting inventory from a source location to a stop location.

Sub-entities further includes a driver 308, which is the driver assigned to the trip. Sub-entities further includes equipment 310, which represents any method of storage or transport used for the movement of goods in a trip from one location to another, such as, a trailer, container, flatbed, or a tank, and so on. It can have sensors/trackers attached for measuring attributes including GPS, temperature, humidity, shock, tilt, pressure, and so on.

Sub-entities further include ship-orders 312, which are part of the inventory metadata that contains order information required for transportation of goods from one location to another in a trip. Sub-entities further includes ship-units 314 that are a transportation handling unit that is used to facilitate ease of transportation in a trip. These can be wooden or metallic pallets, boxes, cartons, automotive racks, and so on. A ship-order can contain one or more ship-units. Sub-entities further include ship-items 316 that are an individual trackable inventory item or items that is being transported and monitored in a trip. It can belong to a ship-unit 314 or can be independent of ship-units 314.

Each of the items and sub-items shown in FIG. 3 can be tracked using a corresponding sensor 101 (e.g., an IoT sensor) that transmits the location of the item, and other information if needed, at predetermined time intervals, in the form of messages. The messages are received by fleet management out of sequence stop detection server 10.

In general, an IoT Fleet Monitoring system such as "IoT Fleet Monitoring Cloud" from Oracle Corp. requires that when a trip is being executed, it should be capable of detecting the actual arrival at, and departure from, planned stops of a trip and record the timestamp of these events. During the execution of the trip, the real time location information of the route traversed is captured by using geo-coordinate sensors continuously at a certain periodicity. These recorded geo-coordinates will be sent to a server monitoring the trip and performing stop arrival and departure detection. This would be the minimal set of requirements for any software to track the location of the trip. With this minimal requirement, the following method is a known solution for detecting the arrival and departure at the stops.

Each planned stop in the trip will have a pair of latitude and longitude sets of geo-coordinates. For each stop, with the geo-coordinates of the stop location as the center, a stop detection radius is determined. This radius could be user defined or a hardwired default used by the trip monitoring component. At any point during the execution of the trip, if the recent known geo-location of the trip falls anywhere within the stop detection radius of the stop, then the arrival at the stop is recorded. Following the arrival detection at a stop, when the last known geo-location of the trip falls outside the stop detection radius of this stop, the trip is considered to have departed from that stop.

Figure 4:
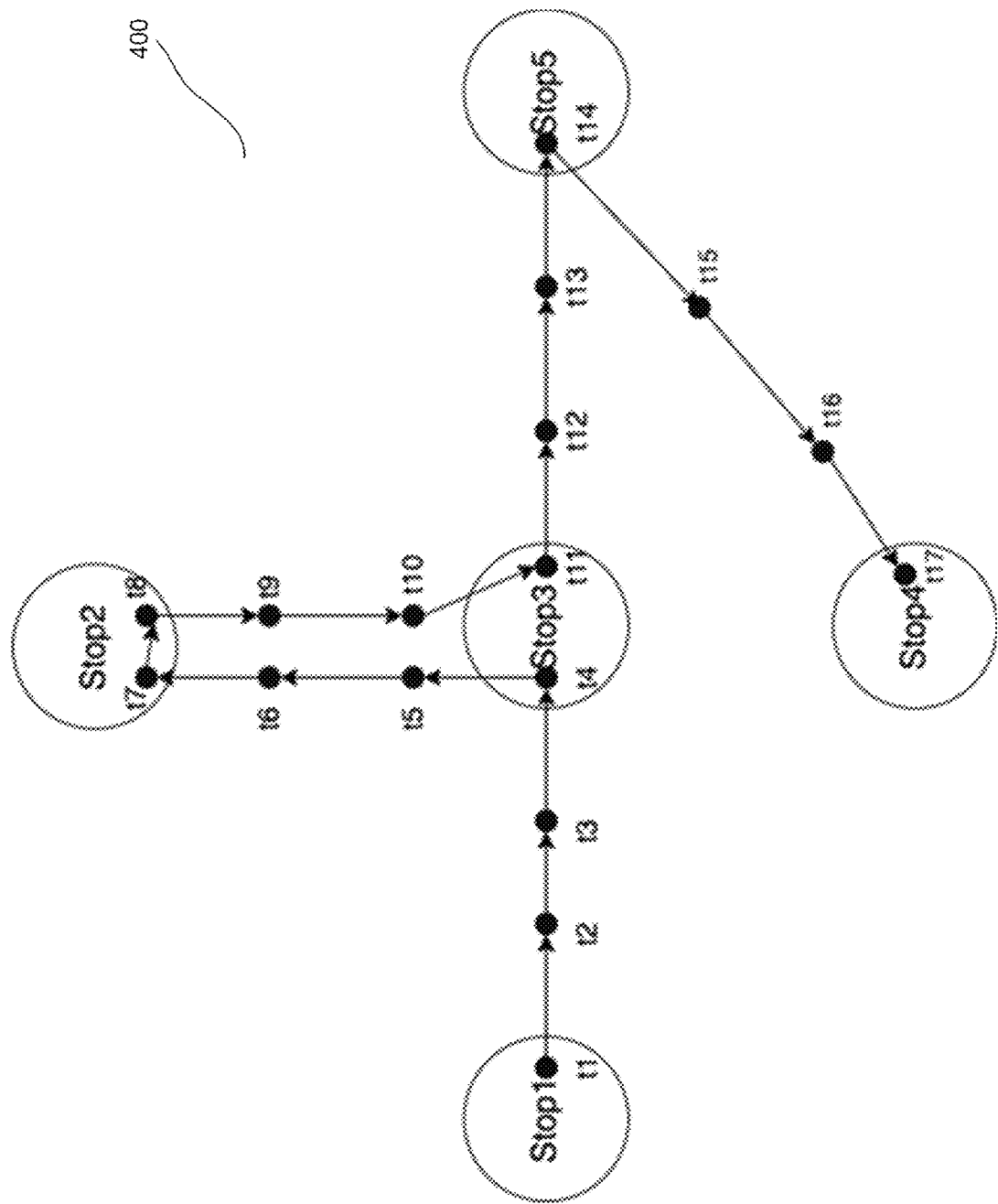
FIG. 4 illustrates a planned trip that includes five planned stops in sequenced order Stop1-Stop 5, and the location of the entity/conveyance (e.g., truck) at various time intervals t1-t17.

FIG. 4 illustrates a planned trip that includes five planned stops in sequenced order Stop1-Stop 5, and the location of the entity/conveyance (e.g., truck) at various time intervals t1-t17. As disclosed, known fleet management solutions to detect each of the stops during the trip of FIG. 4 is to have a detection radius for each stop in the trip and then detect the stops as per the planned sequence (i.e., Stop1-Stop 5). Known solutions would first look for arrival and departure at Stop[i], after that Stop[i+1], and so on.

Specifically, for trip 400 of FIG. 4, the planned stop sequence is Stop1→Stop2→Stop3→Stop4→Stop5. With known solutions, the prior art system would start with looking for arrival and departure at Stop1, on every geo-location ping from the trip, and would record the following values, because t1 is within the radius of Stop1, and t2 is outside the radius of Stop2:

Stop1=>{arrivalTime=$t1$,departureTime=$t2$}

Once this is complete, the prior art system will start looking for arrival and departure at Stop2 (and not any other stops because of the planned sequence) on the subsequent geolocation pings, and would record the following values:

Stop2=>{arrivalTime=$t7$,departureTime=$t9$}

On the subsequent geolocation pings, the prior art system would first look for arrival and departure at Stop3 and would record the following values.

Stop3=>{arrivalTime=$t11$,departureTime=$t12$}

On the subsequent geolocation pings, the prior art system would next look for arrival and departure at Stop4 and then for Stop5, and would record the following values:

Stop4=>{arrivalTime=$t17$,departureTime=null}

Stop5=>{arrivalTime=null,departureTime=null}

As shown, for the example of FIG. 4, the prior art system has only recorded the second arrival and departure at Stop3 which was as per the planned sequence, and it has completely missed the arrival and departure at Stop5 since it was visited out of sequence (before Stop4).

In contrast to prior art solutions, embodiments of the invention look for the arrival and departure at every planned stop in the trip on every geolocation ping instead of just looking for arrival and departure at the immediate next stop in the planned sequence. This ensures that embodiments do not miss detecting arrival/departure at a stop even if the stop is visited out of sequence. If a stop is passed through multiple times, embodiments capture all the (arrival-time, departure-time) event windows. Embodiments then choose the correct arrival/departure time from the captured list either in an automated manner or by human intervention.

Figure 5:
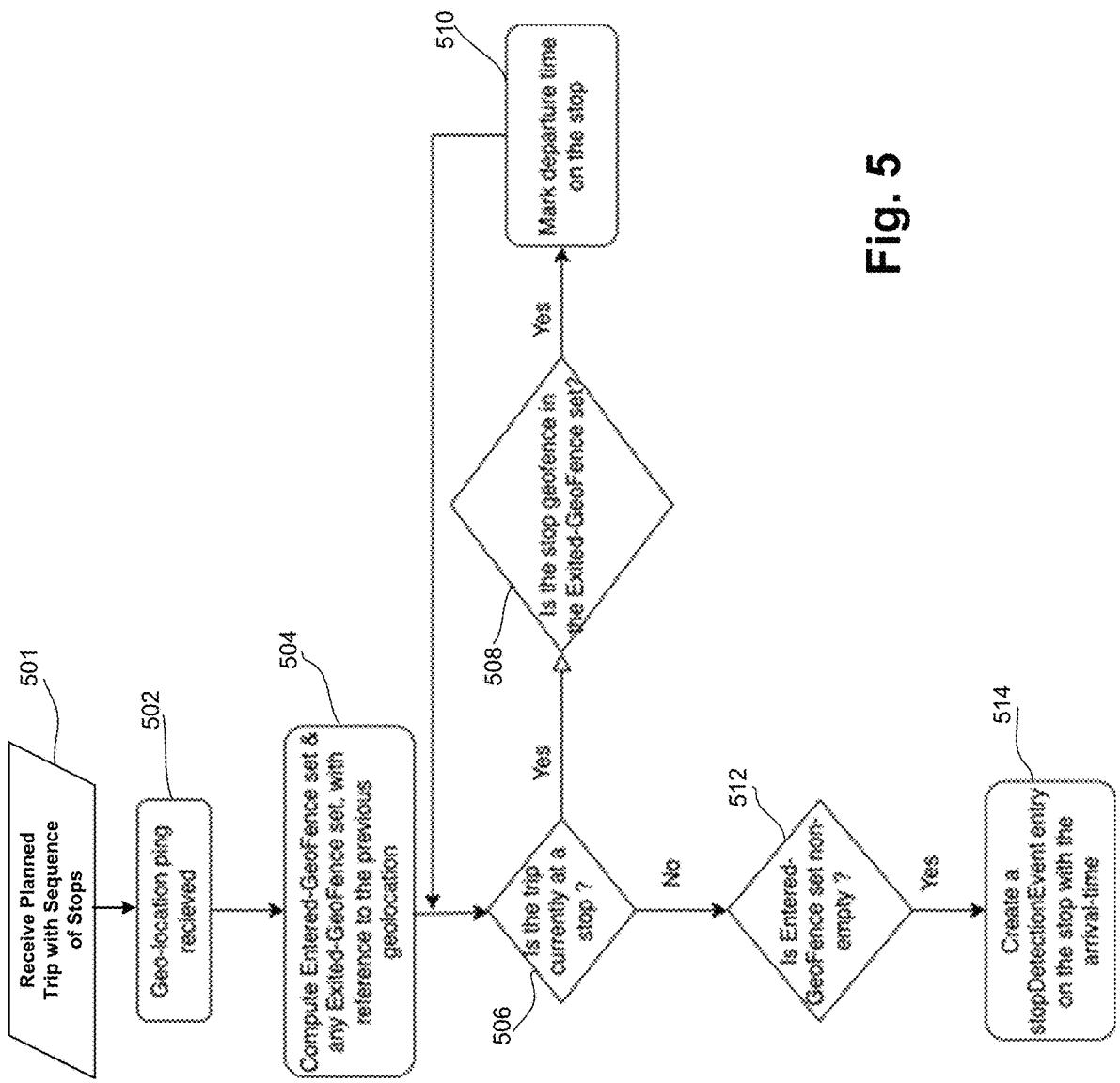
FIG. 5 is a flow diagram of the functionality of the fleet management out of sequence stop detection of FIG. 1 when performing fleet management out of sequence stop detection functionality in accordance to embodiments.

FIG. 5 is a flow diagram of the functionality of fleet management out of sequence stop detection 10 of FIG. 1 when performing fleet management out of sequence stop detection functionality in accordance to embodiments. In one embodiment, the functionality of FIG. 5 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

The functionality of FIG. 5 begins with receiving a created pre-planned trip at 501 (e.g., trip 300 of FIG. 3) that includes a sequence of planned stops, such as the planned stop sequence is Stop1→Stop2→Stop3→Stop4→Stop5 of FIG. 4.

At 502, a new geo-location ping for the trip is received (e.g., a signal/message from an IoT device/GPS device associated with a vehicle that indicates a current location of the vehicle on the planned trip). The geo-location ping includes a location and a corresponding time.

At 504, the set of entered geo-fences ("Entered-GeoFence set") and exited geo-fences ("Exited-GeoFence set") corresponding to stops is determined based on the previous geo-location received before the geo-location at 502. If the detection fences for the stops are non-overlapping (e.g., for some trips, unlike trip 400 of FIG. 4, due the radius of each stops that may be relatively close together, the radius/fences may overlap) then the Entered-GeoFence set and Exited-GeoFence set for any location will always contain at most one fence/stop.

The example trip 400 of FIG. 4 illustrates the functionality of 504 as follows:

Set of all fences for trip 400=[Stop1, Stop2, Stop3, Stop4, Stop5] For location ping at t4 (the previous geo-location ping is at t3). Entered Fence
   Set=[Stop3], Exited Fence Set=[ ]
   For location ping at t5 (the previous geo-location ping is at t4). Entered Fence Set=[ ], Exited Fence Set=[Stop3]
   For location ping at t6 (the previous geo-location ping is at t5). Entered Fence Set=[ ], Exited Fence Set=[ ]
   For location ping at t8 (the previous geo-location ping is at t7). Entered Fence Set=[ ], Exited Fence Set=[ ]

At 506, it is determined if the trip is currently at a stop (i.e., the location of the entity before receiving/processing the new geo-location ping at 502). Specifically, does the stop have an arrival time with no corresponding departure time?

If yes at 506, at 508 it is determined if the stop geofence is in the Exited-GeoFence set. If yes at 508, the time associated with the ping at 502 is marked as the departure time for the stop at 510 and then functionality resumes at 506, where a departure time will now be present so the functionality will go to 512. If no at 508, then the functionality exits and embodiments wait for the next geo-location ping at 502.

If no at 506, at 512 it is determined if the Entered-GeoFence set is non-empty (i.e., includes at least 1 fence/stop). If yes at 512, at 514 a stopDetectionEvent entry is created indicating a stop with a corresponding arrival-time for the ping at 502. If no at 512, then the functionality exits and embodiments wait for the next geo-location ping at 502. For example, with reference to the example of FIG. 4:

While processing geo-location ping at t7, [506] will be evaluated to No (as for Stop1 and Stop3 both arrivalTime and departureTime is set and for the rest of the stops both arrivalTime and departureTime is null), [512] will be evaluated to Yes (as EnteredSet=[Stop2]), [514] will set arrivalTime=t7 on Stop2.

While processing geo-location ping at t8, [506] will be evaluated to Yes (as arrivalTime is marked and departureTime is not marked for Stop2), [508] will be evaluated to No and functionality will exit.

While processing geo-location ping at t9, again [506] will be evaluated to Yes (as arrivalTime is marked and departureTime is not marked for Stop2), [508] will be evaluated to Yes, and functionality will mark departureTime=t9 on Stop2.

Functionality then continues at 502 when the next geo-location ping is received. In generally, the functionality of FIG. 5 results in the monitoring of arrival/departure events for all stops all of the time, as opposed to the prior art which generally only monitors arrival/departure events for the next stop in the sequence of the planned trip.

The following pseudocode illustrates the results (i.e., arrival and departure time) for each of the stops of FIG. 4 using the functionality of FIG. 5. In comparison to the prior art, the arrival and departure times are accurately recorded for each stop. For stop 3, two different arrival/departure times are recorded, with the first set determined (either automatically or via human invention) to be the "true" set of times:

```
{
 "stops": [{
  "name": "Stop1",
  "actualArrivalTime": "t1", "actualDepartureTime": "t2",
  "plannedSequence": 1, "actualSequence": 1,
  "stopDetectionEvents": [
   {
    "arrivalTime": "t1", "departureTime": "t2",
    "recorded": true
   }
  ]
 },{
  "name": "Stop2",
  "actualArrivalTime": "t7", "actualDepartureTime": "t9",
  "plannedSequence": 2,"actualSequence": 3,
  "stopDetectionEvents": [
   {
    "arrivalTime": "t7", "departureTime": "t9",
    "recorded": true
   }
  ]
 },{
  "name": "Stop3",
  "actualArrivalTime": "t4", "actualDepartureTime": "t5",
  "plannedSequence": 3, "actualSequence": 2,
  "stopDetectionEvents": [
   {
    "arrivalTime": "t4", "departureTime": "t5",
    "recorded": true
   },
   {
    "arrivalTime": "t11", "departureTime": "t12",
    "recorded": false
   }
  ]
 },{
  "name": "Stop4",
  "actualArrivalTime": "t17", "actualDepartureTime": "null",
  "plannedSequence": 4, "actualSequence": 5,
  "stopDetectionEvents": [
   {
    "arrivalTime": "t17", "departureTime": null,
```

```
        "recorded": true
      }
    ]
  },{
    "name": "Stop5",
    "actualArrivalTime": "t14", "actualDepartureTime": "t15",
    "plannedSequence": 5, "actualSequence": 4,
    "stopDetectionEvents": [
      {
        "arrivalTime": "t14", "departureTime": "t15",
        "recorded": true
      }
```

Sensor Gateway

In embodiments where there are a large number of IoT sensors 101, and/or some sensors are used for fleet monitoring as disclosed above, while other sensors are used for other types of functionality, a gateway between the sensors and the cloud (which can include out of sequence stop detection 10) is implemented. Examples of other types of functionality for sensors 101 include measurement of temperature, humidity, $CO_2$ levels, GPS, water level, water presence, electrical current/voltage, light, presence, etc. Small sensors or legacy devices can directly transmit their data to a nearby gateway instead of to the cloud, reducing their power consumption and increasing the sensors' battery life.

The gateway communicates with different types of sensors/devices using different protocols and then sends the data to a cloud service using a standard protocol. The gateway acts as a filter for the huge amount of data sent by the devices, processing the data and sending only relevant information to the cloud. Therefore, the processing and storage services is utilized optimally so that the need for processing and storage is reduced. Further, the response time for the sensors is considerably reduced. The nearby gateway receives the sensor data, processes it, and sends relevant commands back to the sensors. Further, gateways are highly secure and they also help secure the sensors and devices that are connected to them.

Figure 6:
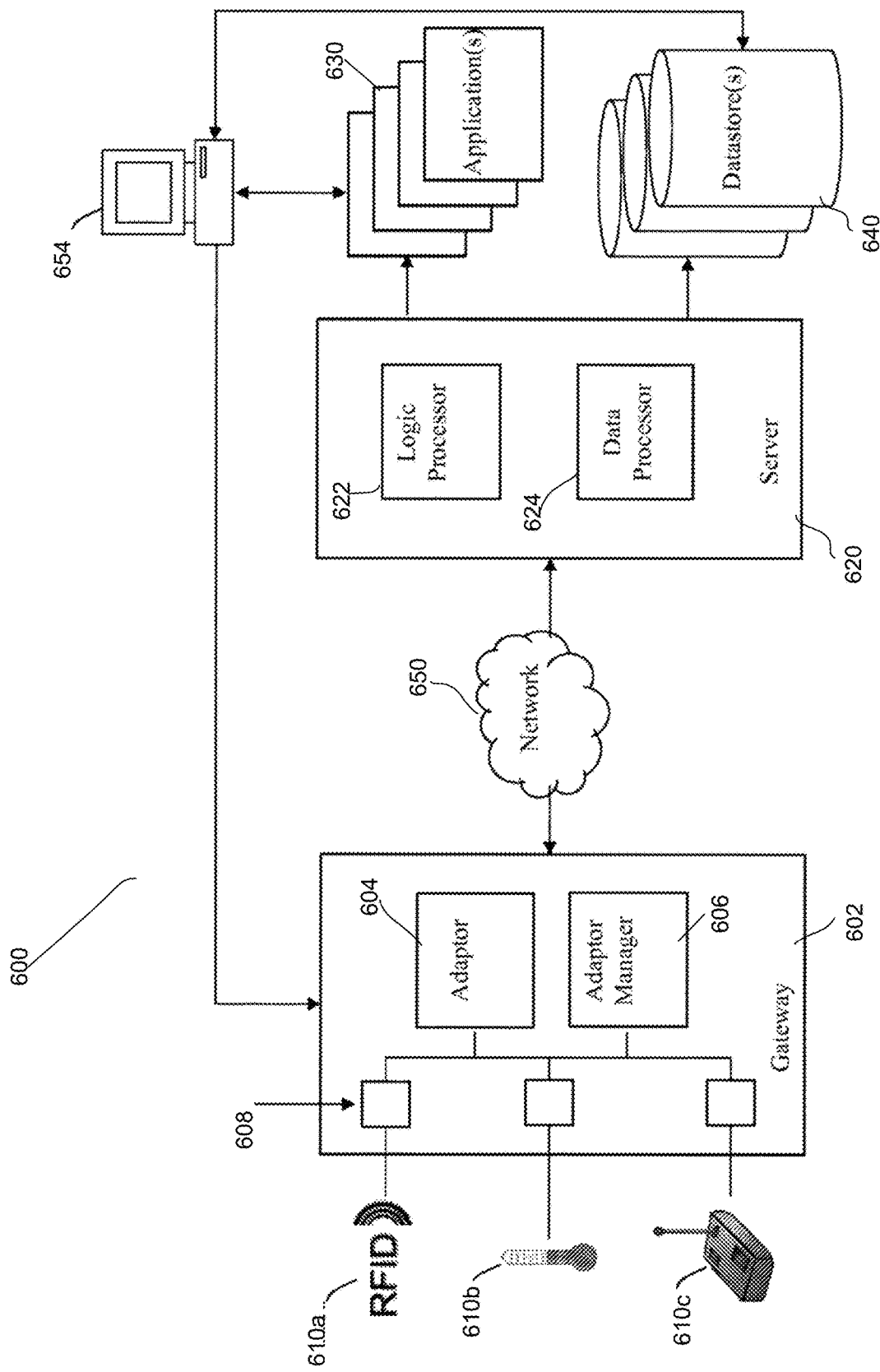
FIG. 6 is a block diagram of a gateway architecture in accordance to embodiments of the invention.

FIG. 6 is a block diagram of a gateway architecture 600 in accordance to embodiments of the invention. Architecture 600 permits effective integration between the systems in the operations technology portion and the systems in the information technology portion of the environment. Architecture 600 generally includes a gateway portion 602 having front-end data collection logic, and a server portion 620 to perform back-end processing of the collected data. To handle many different device/sensor types (including IoT sensors 101) and to provide the ability to handle high numbers of units being deployed in the field, embodiments provide a robust platform for handling issues such as: (a) sensor definition; (b) sensor management; (c) data capture; (d) data processing; (e) data transfer; (f) data storage; (g) analysis; and/or (h) visualizations. This architecture provides a framework for interfacing with any type of local device that may be deployed at a client site, and to allow data captured from those devices to be sent to a remote server, and to have the collected data be both locally and remotely programmatically processed. Gateway architecture 600, in general, can function as a sensor message receiving module that receives sensor messages.

Gateway 602 includes a sensor management module that handles the sensor code (e.g., that is implemented as custom code, such as Java code, specific to each sensor hardware). This module captures the sensor data in a generic way so that any type of data can be used. The gateway locally caches data so it can be pre-processed locally and no data is lost when there is no network connectivity. The data preprocessor performs actions such as data filtering using a set of rules. The system throttles the data so that data rates do not overwhelm the capabilities of the client gateway or the network. An internal data store may be included to store data in a platform-agnostic way. A data transfer module is employed to build the data for transmission. The system permits client gateways to talk to each other so as to establish a mesh network ensuring resiliency and connectedness.

In general, gateway 602 performs data acquisition and management of local devices 610a-c. The local devices 610a-c may include any type of equipment that can be suitably managed by architecture 600. For example, any number of sensors may be embedded within the local equipment at various sites. Examples of such sensors include RFID sensors at device 610a, temperature sensors at device 610b, and other types of smart devices, beacons, and/or machines at device 610c (including IoT sensors 101).

Local devices 610a-c can be configured to send data at regular intervals to gateway 602. Such data may include information to be captured from the local devices. For example, information that may be captured include operating conditions, metrics, pressure, vibration, temperature, and/or flow rate.

In additional to using sensor data for fleet management, as disclosed above, other examples of the uses for sensor data may include: (a) handling perishable goods, where the system continuously monitors the temperature, humidity and location of goods as they travel through the supply chain, where by monitoring these critical factors and taking quick action on alerts, one can significantly reduce the spoiled goods and as a result increase revenue; (b) managing heavy machinery, by tracking the locations of a company's equipment along with environment conditions and operating metrics of the equipment, thereby ensuring that the equipment is being operated properly, preventing machine failures, and ensuring that the equipment is being properly used to the organization's goods and services; and (c) providing product support, where products that are sold could communicate back to the maintenance organization with current status, diagnostic information, and available quantity of consumables, and where the provided information helps to deliver a better quality of service to customers by discovering potential failures before they impact the customer and also increase revenue through expanded service offerings and replenishment of consumables.

Gateway 602 includes an adaptor component 604 and an adaptor manager 606. Adaptor component 604 (also referred to herein as an "IoT adaptor") manages the gateway's interaction with local devices 610a-c, and may include device-specific code components 608 to perform its processing with local devices 610a-c. Adapter manager 606 (also referred to herein as an "IoT adaptor manager") is used to manage the operations, versioning, and/or provisioning of local devices 610a-c and adaptor component 604. In some embodiments, gateway 602 processes incoming data with local analytics (e.g., to analyze operating conditions and to identify fluctuations). To the extent necessary, alerts and data readings can be sent in real-time.

The data collected by gateway 602 are sent over a network 650 to server 620. Server 620 efficiently receives data from potentially a multitude of client gateways. The server module parses the data and caches it locally to expedite data capture. Pre-processing of the data may be performed for filtering, applying simple or complex script-based rules, etc. The data may be stored in an internal database. The persisted data can be forwarded to a corporate, generic table store. The server module may also take action based on the result of rules applied on the data, such as calling a web service, invoking further more complex rules, sending control data back to devices, etc. A generic table format can be used to store the sensor data within the enterprise application ecosystem. Keeping the relevant data within the ecosystem allows the use of standard tools in the enterprise application, such as reporting tools and form design tools. This means that users can use their pre-existing tools and systems to process the data from the operations technology ("OT") side, which allows the user to use systems which they are well-versed in using to report on and add intelligence to the data that is captured. An open interface (e.g., a RESTful interface) enables the captured data to be enquired and allows the development of rich, responsive, up-to-date client interfaces.

At server 620, a logic processor 622 (also referred to herein as an "IoT logic processor") and a data processor 624 (also referred to herein as an "IoT data processor") are provided to implement analysis and alert processing. These components may include operations technology and industry-specific rules and scripts.

Server 620 may communicate with one or more applications 630. Such applications 630 may include, for example, functionality to implement inventory management, quality management, condition-based maintenance, and/or provide a visualization portal, as well as functionality of FIG. 5 for out of sequence stop detection. Examples of these applications include, for example, Emergency Shutdown ("ESD") systems, Supervisor Control and Data Acquisition ("SCADA") systems, data analytics tools, BI ("business intelligence") tools, customer relationship management ("CRM") products, enterprise resource planning ("ERP") products, enterprise marketing products, financials applications, and/or procurement applications. The application products are hosted on computing hardware operated by the cloud provider.

Server 620 may also manage the storage of the collected data into one or more datastores 640. Datastore 640 includes any combination of hardware and software that allows for ready access to the data that is located at a computer readable storage device. For example, datastore 640 could be implemented as computer memory operatively managed by an operating system. The data in datastore 640 could also be implemented as database objects and/or files in a file system.

One or more users may exist at one or more user stations 654 that interact with the architecture 600. User station 654 includes any type of computing station that may be used to operate or interface with architecture 600. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the architecture 600, such as a mouse or keyboard to manipulate a pointing object in a graphical user interface to generate user inputs.

Either server 620 or the user at user station 654 may provide control signals to gateway 602 to control the operation of the gateway 602 and/or the local devices 610a-c. The control signals may be used to control any operation necessary at the gateway and/or local device 610a-c, including for example, to update and provision control software on the gateway and/or to control operation of the local device. Further details of the functionality of architecture 600, which can be used in conjunction with out of sequence stop detection network/system 150 of FIG. 1, is disclosed in U.S. Pat. No. 10,382,294.

In embodiments, the generated sensor messages are generated as a specialized data structure that includes attributes of sensors, vehicles, etc. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

As disclosed, for a planned trip with a planned sequence of stops, embodiments determine when a stop was entered and exited even when the stop was out of the planned sequence. Embodiments ensure that the detecting arrival/departure at a stop is not missed even if the stop is visited out of sequence. Further, when a stop is passed through multiple times (e.g., Stop3 of FIG. 4), embodiments capture all the (arrival-time, departure-time) event windows and record the first one as the actual-arrival-time and actual-departure-time, but provides for automated or human interaction to select an alternative arrival/departure time.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of detecting stops by an entity on a pre-planned trip comprising a plurality of stops and a planned sequence of stops, each stop having a corresponding geofence, the method comprising:
   receiving during the trip a first geo-location message indicating a first location and corresponding first time for the entity;
   based on the first geo-location message and a previous geo-location message, automatically updating an enter geofence set and an exit geofence set, wherein the enter geofence set comprises all geofences entered and stopped during the trip and the exit geofence set comprises all geofences exited after a stop during the trip;
   when the entity was, based on the previous geo-location message, at a first stop of one of the plurality of stops because the first stop has a stored current arrival time and does not have a corresponding stored departure time and the first stop is in the exit geofence set, automatically storing the first time as the corresponding departure time for the first stop, wherein the first stop is out of sequence to the planned sequence of stops;
   when the first stop is not in the exit geofence set, automatically ignoring the first geo-location message and automatically not storing the first time as the stored departure time for the first stop and instead waiting for the next received message; and
   when the entity was not, based on the previous geo-location message, at one of the plurality of stops and the enter geofence set is non-empty, automatically storing the first time as an arrival time for a next stop corresponding to the first location.

2. The method of claim 1, wherein each of the plurality of stops comprise a corresponding geofence having a radius.

3. The method of claim 2, wherein two or more of the geofences overlap.

4. The method of claim 1, wherein the entity is associated with an Internet of Things (IoT) device that provides the first geo-location message and the first geo-location message is received via a gateway sensor that is configured to communicate with a plurality of IoT devices having different protocols and converting the different protocols to a standard protocol.

5. The method of claim 1, wherein the entity comprises a vehicle and the pre-planned trip comprises a trip plan comprising, for the vehicle, a start location, an end location, and the plurality of stops in the planned sequence.

6. The method of claim 1, further comprising automatically generating a plurality of arrival times and departure times for the current stop, and automatically selecting one set of arrival time and departure time.

7. The method of claim 2, wherein none the geofences overlap, and each of the enter geofence set and the exit geofence set include at most one stop.

8. A non-transitory computer-readable medium having instructions stored thereon that, when executed by one or more processors, cause the processors to detect stops by an entity on a pre-planned trip comprising a plurality of stops and a planned sequence of stops, each stop having a corresponding geofence, the detecting stops comprising:
   receiving during the trip a first geo-location message indicating a first location and corresponding first time for the entity;
   based on the first geo-location message and a previous geo-location message, automatically updating an enter geofence set and an exit geofence set, wherein the enter geofence set comprises all geofences entered and stopped during the trip and the exit geofence set comprises all geofences exited after a stop during the trip;
   when the entity was, based on the previous geo-location message, at a first stop of one of the plurality of stops because the first stop has a stored current arrival time and does not have a corresponding stored departure time and the first stop is in the exit geofence set, automatically storing the first time as the corresponding departure time for the first stop, wherein the first stop is out of sequence to the planned sequence of stops;
   when the first stop is not in the exit geofence set, automatically ignoring the first geo-location message and automatically not storing the first time as the stored departure time for the first stop and instead waiting for the next received message; and
   when the entity was not, based on the previous geo-location message, at one of the plurality of stops and the enter geofence set is non-empty, automatically storing the first time as an arrival time for a next stop corresponding to the first location.

9. The computer-readable medium of claim 8, wherein each of the plurality of stops comprise a corresponding geofence having a radius.

10. The computer-readable medium of claim 9, wherein two or more of the geofences overlap.

11. The computer-readable medium of claim 8, wherein the entity is associated with an Internet of Things (IoT) device that provides the first geo-location message and the first geo-location message is received via a gateway sensor that is configured to communicate with a plurality of IoT devices having different protocols and converting the different protocols to a standard protocol.

12. The computer-readable medium of claim 8, wherein the entity comprises a vehicle and the pre-planned trip comprises a trip plan comprising, for the vehicle, a start location, an end location, and the plurality of stops in the planned sequence.

13. The computer-readable medium of claim 8, the detecting stops further comprising automatically generating a plurality of arrival times and departure times for the current stop, and automatically selecting one set of arrival time and departure time.

14. The computer-readable medium of claim 9, wherein none the geofences overlap, and each of the enter geofence set and the exit geofence set include at most one stop.

15. A fleet monitoring system for detecting stops by an entity on a pre-planned trip comprising a plurality of stops and a planned sequence of stops, each stop having a corresponding geofence, the system comprising:
   a sensor message receiving module;
   one or more processors that execute instructions to, in response to receiving sensor messages from the sensor message receiving module:
      receive during the trip a first geo-location message indicating a first location and corresponding first time for the entity;
      based on the first geo-location message and a previous geo-location message, automatically update an enter geofence set and an exit geofence set, wherein the enter geofence set comprises all geofences entered and stopped during the trip and the exit geofence set comprises all geofences exited after a stop during the trip;

when the entity was, based on the previous geo-location message, at a first stop of one of the plurality of stops because the first stop has a stored current arrival time and does not have a corresponding stored departure time and the first stop is in the exit geofence set, automatically store the first time as the corresponding departure time for the first stop, wherein the first stop is out of sequence to the planned sequence of stops;

when the first stop is not in the exit geofence set, automatically ignore the first geo-location message and automatically not store the first time as the stored departure time for the first stop and instead wait for the next received message; and when the entity was not, based on the previous geo-location message, at one of the plurality of stops and the enter geofence set is non-empty, automatically store the first time as an arrival time for a next stop corresponding to the first location.

16. The fleet monitoring system of claim 15, wherein each of the plurality of stops comprise a corresponding geofence having a radius.

17. The fleet monitoring system of claim 16, wherein two or more of the geofences overlap.

18. The fleet monitoring system of claim 15, wherein the entity is associated with an Internet of Things (IoT) device that provides the first geo-location message and the first geo-location message is received via a gateway sensor that is configured to communicate with a plurality of IoT devices having different protocols and converting the different protocols to a standard protocol.

19. The fleet monitoring system of claim 15, wherein the entity comprises a vehicle and the pre-planned trip comprises a trip plan comprising, for the vehicle, a start location, an end location, and the plurality of stops in the planned sequence.

20. The fleet monitoring system of claim 16, wherein none the geofences overlap, and each of the enter geofence set and the exit geofence set include at most one stop.

* * * * *